March 20, 1962 G. W. STANTON ET AL 3,026,292
N-VINYL-3-MORPHOLINONE-POLYAMIDE GRAFT COPOLYMER
AND METHOD OF PREPARING SAME
Filed Jan. 7, 1959
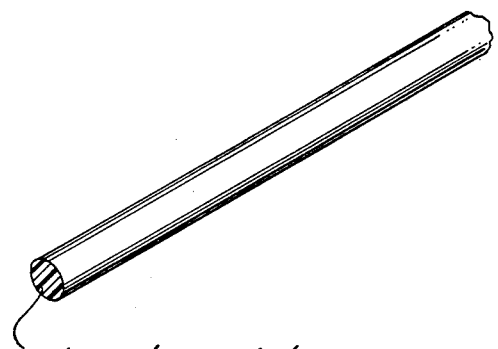
Filamentous article comprising a graft copolymer of N-vinyl-3-morpholinone on a superpolyamide polymer substrate.
INVENTORS.
George W. Stanton
Teddy G. Traylor
BY Jerome Rudy
ATTORNEY 3,026,292
N-VINYL-3-MORPHOLINONE-POLYAMIDE GRAFT COPOLYMER AND METHOD OF PREPARING SAME
George William Stanton, Williamsburg, Va., and Teddy Gene Traylor, Concord, Calif., assignors to The Dow Chemical Company, Midland, Mich., a corporation of Delaware
Filed Jan. 7, 1959, Ser. No. 785,382
6 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of N-vinyl-3-morpholinone monomers, as hereinafter more fully described, polymerized on superpolyamide polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Superpolyamide polymers may be utilized with great advantage for such purposes.

The fiber-forming linear superpolyamide polymers that are contemplated as being adapted for employment as polymer substrates in the practice of the present invention include any of the thermoplastic resinous products that are obtained from the condensation between dicarboxylic acids and diamines or their equivalents, as well as those that may be prepared from such monomeric derivatives as the epsilon lactam derivatives of certain amino carboxylic acids, particularly those that are generically characterized as being "nylons," by which term such superpolyamide polymers will hereinafter be referred to. Advantageously, the nylon substrate that is utilized may be the fiber-forming resinous condensation product of hexamethylene-diamine and adipic acid, such as the commercially available material of this type which is frequently referred to as being "nylon 6–6"; or the also commercially available, fiber-forming condensation products of epsilon caprolactam, such as the superpolyamide product of this type that is variously referred to as "nylon 6" or "Perlon." These and other fiber-forming superpolyamides are discussed by Donald E. Floyd in "Polyamide Resins" (Reinhold, N.Y., 1958).

Difficulty is often encountered, however, in suitably dyeing synthetic hydrophobic fibers and the like that have been prepared from such superpolyamide (or, more simply, polyamide) polymers. This is especially the case when it is attempted to obtain relatively deeper shades of coloration in the finally dyed product, and is particularly true when certain varieties of dyestuffs, such as basic dyes, are involved.

Various techniques have been evolved for providing superpolyamide polymer compositions of improved dyeability. The practice of such techniques has not always been completely satisfactory. Neither have the products thereby achieved always provided a completely suitable solution to the problems involved. For example, many of the fiber products which are prepared in accordance with the above-identified techniques known to the art often have inferior properties and characteristics when they are compared with those prepared from unmodified superpolyamide polymers. Furthermore, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide superpolyamide polymers which have been modified with certain graft or block copolymerized substituents so as to be exceptionally dye-receptive, especially of basic type dyestuffs, while being capable of being fabricated into fibers and the like and related shaped articles having excellent physical properties and other desirable characteristics commensurate with those obtained with the unmodified superpolyamide polymer substrates, and of the general order obtainable, for example, with "nylon 6–6" or "nylon 6." This would possibilitate the manufacture of superpolyamide polymer-based fibers and the like articles having the highly desirable combination of attractive physical characteristics and substantial capacity for and acceptance of dyestuffs.

To the attainment of these and related ends, a dye-receptive superpolyamide polymer composition that is adapted to provide shaped articles having excellent physical properties and characteristics while being simultaneously receptive of and dyeable to deep and level shades of coloration with basic dyes as well as many others of a wide variety of dyestuffs is, according to the present invention, comprised of a fiber-forming graft or block copolymer which consists of a superpolyamide polymer substrate having a minor proportion of substituents graft copolymerized thereto that are comprised or consist essentially of polymerized units that have been derived from N-vinyl-3-morpholinone monomers as hereinafter more fully identified.

Schematically, the compositions may be structurally represented in the following manner:

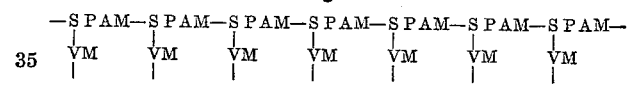

wherein the interlinked "SPAM" symbols represent the superpolyamide polymer substrate or "backbone" trunk and the symbols "VM" connected thereto the substituent N-vinyl-3-morpholinone graft copolymer branches of the N-vinyl-3-morpholinone monomer provided thereon. As is apparent, the graft copolymerized N-vinyl-3-morpholinone units are attached to the superpolyamide polymer substrate through or by means of carbon linkages, at least insofar as connection with the polymerized monomer units is concerned.

The graft copolymer substituent that is combined with the superpolyamide polymer substrate lends the desired receptivity of and substantivity for various dyestuffs to the compositions while the superpolyamide polymer trunk substrate that is so modified facilitates and secures the excellent physical properties and characteristics of the various shaped articles, including fibers, into which the compositions may be fabricated. Advantageously, as mentioned, the superpolyamide polymer substrate that is modified by graft copolymerization to provide the compositions of the invention is "nylon 6–6," although "nylon 6" substrates may also be utilized with great advantage.

It is usually beneficial, as has been indicated, for the graft copolymer compositions of the present invention to contain a major proportion of the superpolyamide polymer trunk or substrate that has been modified with the substituent, dye-receptive, graft copolymer groups chemically attached thereto. As a general rule, for example, it is desirable for the graft copolymer to be comprised of at least about 80 percent by weight of the superpolyamide polymer substrate. In many instances, it may be satisfactory for the graft copolymer composition to be comprised of between about 85 and 95 percent by weight of the superpolyamide polymer substrate, particularly when it is "nylon 6–6" or "nylon 6." In this connection however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available than to have a greater number of substituents of relatively shorter chain length.

The N-vinyl-3-morpholinone monomer which is utilized to modify the acrylonitrile polymer substrates so as to provide the graft copolymer compositions of the present invention is of the general structure:

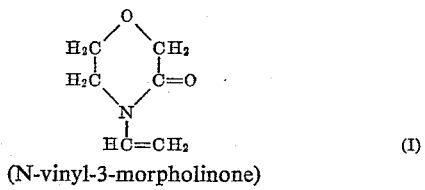

(N-vinyl-3-morpholinone) (I)

This monomer, also for sake of convenience and brevity, is hereinafter referred to as "VM." As is apparent, the monomeric VM may in many cases be utilized in combination or mixtures with certain of its homologues, such as the various alkyl (particularly methyl and ethyl)-ring-substituted-N-vinyl-3-morpholinones. VM may also be termed 4-vinyl-3-morpholinone.

The monomeric material employed for preparation of graft copolymers on preformed substrate superpolyamide polymers in practice of the present invention is disclosed and described in United States Letters Patent No. 2,891,058.

As mentioned, the graft copolymer compositions of the invention have remarkably good dye-receptivity, especially of basic dyestuffs, particularly in view of their superpolyamide polymer origin. In most cases, for example, the dye-receptivity of the graft copolymer compositions of the present invention is improved to such an extent in comparison with unmodified superpolyamide polymers, particularly unmodified "nylon 6–6," that a color differential of at least about 30 Judd units, as hereinafter illustrated, may readily be obtained between samples of the unmodified superpolyamide polymer substrate and the graft copolymer compositions of the present invention, each of which have been dyed under identical conditions according to conventional techniques with any of the basic dyestuffs. A noticeable and significant improvement in dye-receptivity of the super-polyamide substrate may even be achieved by practice of the present invention as regards its acceptance of the direct and acid types of dyestuff, despite the fact that such dyes are normally considered to be suitable for the coloration of nylon polymers. This is a significant advantage when the compositions are fabricated into shaped article form, especially when they are prepared in a filamentary form suitable for use as a textile material.

Judd units are explained in an article by D. B. Judd in the "American Journal of Psychology," vol. 53, page 418 (1939). More information concerning Judd units appears in "Summary on Available Information on Small Color Difference Formulas" by Dorothy Nickerson in the Amercan Dyestuff Reporter, vol. 33, page 252, June 5, 1944. Also see "Interrelation of Color Specifications" by Nickerson in "The Paper Trade Journal," vol. 125, page 153 for November 6, 1947.

Besides having excellent physical properties and other desirable characteristics, fibers and the like articles comprised of the present compositions similarly have the indicated high capacity for being readily and satisfactorily dyed to deep and level shades of coloration with many dye-stuffs in addition to basic dyes. For example, fibers of the present compositions may be easily and successfully dyed according to conventional procedures using acid, vat, acetate, direct, naphthol, and sulfur dyes. Such dyestuffs, by way of didactic illustration, as Calcocid Alizarine Violet (Colour Index 51710, formerly Colour Index 1080), Sulfanthrene Red 3B (Colour Index Vat Violet 2), Amacel Scarlet BS (Colour Index Disperse Red 1 or 11110), Calcodur Pink 2BL (Colour Index 353, also more recently, Colour Index Direct Red 75), Naphthol ASMX (Colour Index 35527), Fast Red TRN Salt (Colour Index Azoic Diazo 11), and Immedial Bordeaux G (Colour Index Sulfur Brown 12) may advantageously be employed for such purposes.

Other dyestuffs, by way of further illustration, that may be utilized beneficially on the N-vinyl-3-morpholinone graft copolymerized fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Cellanthrene Red 3BN Conc. (both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←-2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products, especially textile fiber products, are generally lightfast and are well imbued with good resistance to crocking.

A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the superpolyamide polymer substrate with the monomeric substance then polymerizing the monomer in situ in the polymer substrate. Advantageously, this may be accomplished when the substrate is in the form of an already shaped article, such as a fiber or filamentary structure. Beneficially the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequentially initiate the graft copolymerization. As a practical matter, it is generally most desirable to form the graft copolymer compositions in such a manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated superpolyamide polymer substrate to a field of high energy radiation in order to efficiently provide an effectively attached graft copolymer of the polymerized monomeric impregnant on the hydrophobic superpolyamide polymer substrate.

The monomer may be intimately impregnated in the superpolyamide polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the superpolyamide polymer substrate with the latter being immersed in the bath for a sufficient period of time to attain a desired monomer content adequate for the intended purpose. The superpolyamide polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the superpolyamide polymer (or a cloth or fabric comprised thereof) with the monomer in orderd to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant invoved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on pre-activated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped superpolyamide polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage for the preparation of the graft copolymer compositions of the present invention include hydrogen peroxide, benzoyl peroxide, cumene hydroperoxide, ammonium or potassium persulfate and the like. Such catalysts may be used in conventional quantities to effect the great copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and sesium-137, nuclear reactor fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the superpolyamide polymer substrate being modified in order to provide the compositions of the present invention. In addition, as has been indicated, particularly when pre-activation of the substrate is performed, ultraviolet light may also be employed as the high energy radiation form. Preactivation or graft site formation with oxygen and ultraviolet light or ozone may also be satisfactory in many instances.

For purposes of specifically illustrating, without intending to thereby limit the invention, the following didactic exemplifications are provided wherein, unless otherwise indicated, all parts and percentages are to be taken by weight.

*Illustration A*

"Nylon 6-6" staple fiber is scoured and soaked for 30 minutes in a 10 percent aqueous solution of N-vinyl-3-morpholinone (VM). The wet fiber, containing about 10 percent of the monomer impregnated therein, is then exposed at a distance of about 1 centimeter from a Machlett OEG-50 tube that is operated at 50,000 volts and 50 milliamperes. The exposure is continued for 25 minutes. The irradiated yarn is then washed thoroughly with water, dried, scoured and then dyed at the 2 percent level for one hour at the boil in Sevron Brilliant Red 4G, a basic dye formerly known as Basic Red 4G (Colour Index Basic Red 14). A deep red shade of coloration is obtained. In contrast, the unmodified yarn can be dyed to only the faintest degree with the same dyestuff.

The graft copolymerized fiber product is also dyed well to deep and level shades of coloration with Amacel Scarlet BS. The graft copolymer product is found more readily and easily dyed than the unmodified nylon.

*Illustration B*

The procedure of the first illustration is repeated excepting to impregnate the staple nylon fiber with a mixed aqueous solution containing 5 percent each of VM and methylene-bis-acrylamide. The resulting modified yarn dyes to an even deeper shade of red with Sevron Brilliant Red 4G than that of Illustration A.

Illustration C

The procedure of Illustration B is repeated excepting to employ a mixture of sodium p-styrene sulfonate and VM as the monomeric impregnant. The resulting modified nylon yarn is observed to be readily dyeable with Sevron Brilliant Red 4G. Its dyeability with Calcodur Pink 2BL, a direct dye, is also much improved over the unmodified nylon.

Illustration D

About 0.5 gram on a dry weight basis of "nylon 6–6" staple fiber is first scoured then placed in about 5 milliliters of VM to impregnate the monomer into the polymer substrate. After the impregnation, the monomer-containing fiber sample is flushed with nitrogen and then irradiated by exposure at room temperature to a high energy, X-ray radiation beam from a Van de Graaff Electrostatic Generator operating under a potential of 2 million electron volts with a 250 microampere beam current impinging on a tungsten target. The monomer impregnated fiber is subjected to the high energy at a dosage rate of about 60 Mrep. (million roentgen equivalent physicals) per minute until a total dose of about 10 Mrep. is obtained. The irradiated yarn is then washed thoroughly with water, dried, scoured and then dyed in the conventional manner with Calcodur Pink 2BL. Excellent results are experienced. A tremendous improvement in the dyeability of the graft copolymer product is noted as compared to that of the plain nylon.

Results similar to the foregoing may also be obtained when any other of the mentioned monomeric alkyl-ring-substituted homologues of N-vinyl-3-morpholinone or mixtures thereof are utilized in place of VM in a similar manner to that set forth in the above illustrations and when graft copolymers are prepared with such monomers on unfabricated forms of the superpolyamide polymer substrate or when the graft copolymerization is accomplished with other varieties of superpolyamide polymers besides those used for purposes of didactic exemplification.

What is claimed is:

1. Dye-receptive graft copolymer composition comprised of (1) a fiber-forming, synthetic, linear polymeric carbonamide which contains recurring carbonamide groups as an integral part of the main polymer chain separated by at least two carbon atoms having along its chain, as graft copolymerized substituents thereon, up to about 20 weight percent, based on graft copolymer composiiton weight, of (2) polymerized N-vinyl-3-morpholinone.

2. The composition of claim 1, wherein said polymeric carbonamide has between about 5 and 15 percent by weight, based on the weight of the composition, of said graft copolymerized substituents attached thereto.

3. The composition of claim 1, wherein said polymeric carbonamide is the condensation product of hexamethylene diamine and adipic acid.

4. A filamentary shaped article comprised of the composition of claim 3.

5. A filamentary shaped article comprised of the composition of claim 1.

6. Method for the preparation of a dye-receptive graft copolymer composition which comprises mixing a minor proportion of an N-vinyl-3-morpholinone monomer with a preformed, fiber-forming synthetic, linear polymeric carbonamide which contains recurring carbonamide groups as an integral part of the main polymer chain separated by at least two carbon atoms; then subjecting said mixture to polymerization at a temperature between about 0° C. and 200° C. until up to about 20 weight percent, based on resulting composition weight, of said N-vinyl-3-morpholinone monomer is polymerized as graft copolymer substituents on said polymeric carbonamide chain.

References Cited in the file of this patent

UNITED STATES PATENTS

| | | |
|---|---|---|
| 2,818,362 | Drechsel | Dec. 31, 1957 |
| 2,948,708 | Walles et al. | Aug. 9, 1960 |